(12) United States Patent
Barker et al.

(10) Patent No.: US 7,672,592 B2
(45) Date of Patent: * Mar. 2, 2010

(54) OPTICAL TRANSMITTER SYSTEM

(75) Inventors: Andrew James Barker, Attenborough (GB); Philip Andrew Arnold, Rugby (GB)

(73) Assignee: Ericsson AB, Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 12/229,581

(22) Filed: Aug. 25, 2008

(65) Prior Publication Data

US 2008/0317463 A1 Dec. 25, 2008

Related U.S. Application Data

(63) Continuation of application No. 10/469,806, filed on Apr. 14, 2004, now Pat. No. 7,440,698.

(51) Int. Cl.
*H04J 14/02* (2006.01)

(52) U.S. Cl. .............................. 398/94; 398/7; 398/15; 398/91; 398/197

(58) Field of Classification Search .................... 398/7, 398/34, 94, 197, 15, 91; 372/29, 21, 29.021
See application file for complete search history.

(56) References Cited

U.S. PATENT DOCUMENTS 5,825,949 A * 10/1998 Choy et al. .................. 385/24

* cited by examiner

*Primary Examiner*—Christina Y Leung
(74) *Attorney, Agent, or Firm*—Kirschstein et al.

(57) ABSTRACT

An optical transmitter system supplies a plurality of different wavelength optical radiation components to a transmission element which, in operation, is connected to the transmitter system for conveying the different wavelength radiation components to a respective receiver. The supply of the wavelength components is interrupted, preferably in response to a loss of the wavelength components at the respective receiver. A timer provides respective restart times which differ one to another for the wavelength radiation components. The supply of the wavelength components is restarted, following an interruption, at the respective restart times provided by the timer.

Figure 1:
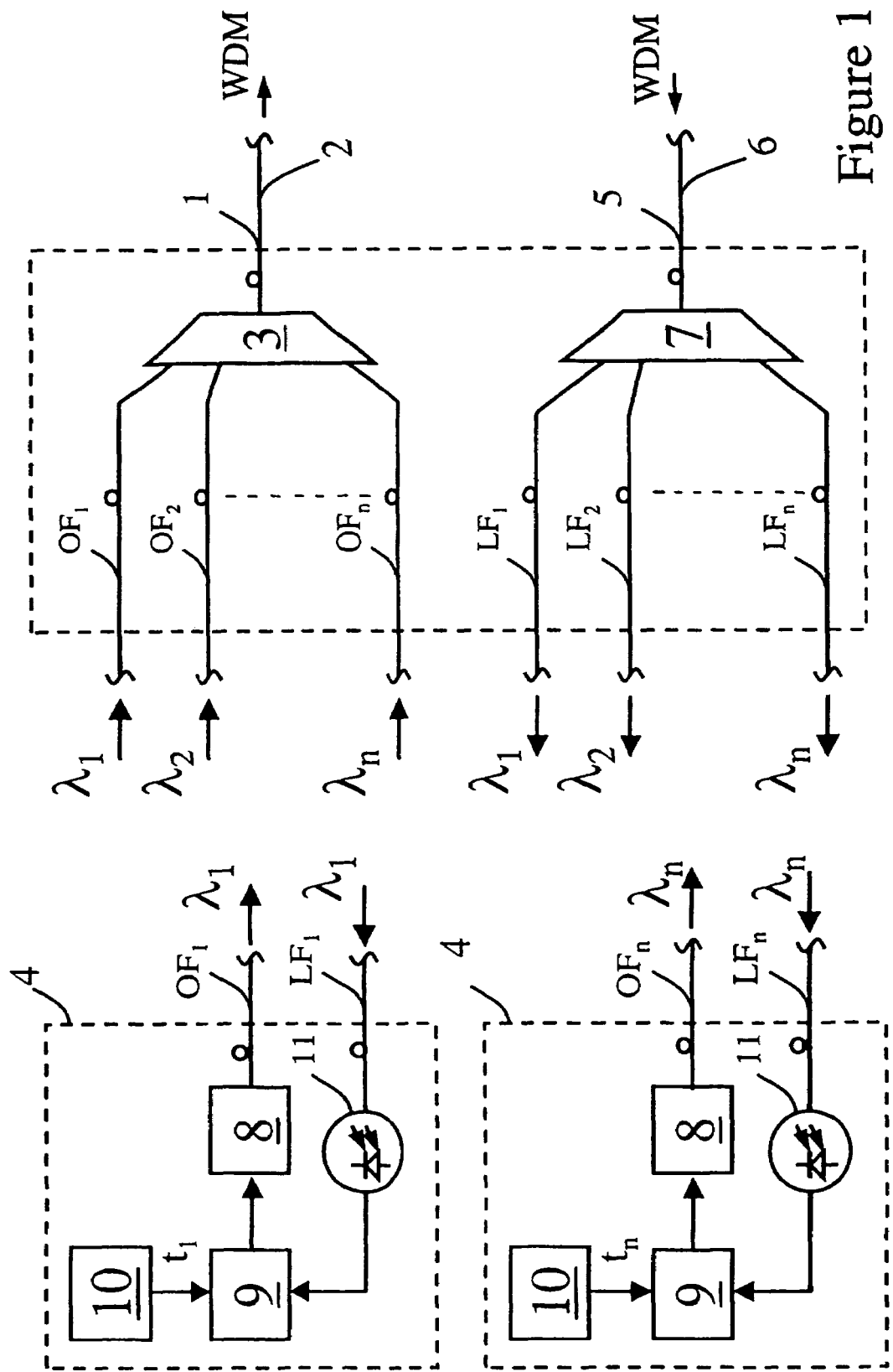

17 Claims, 1 Drawing Sheet

OPTICAL TRANSMITTER SYSTEM

CROSS REFERENCE TO RELATED APPLICATION

This application is a continuation of U.S. patent application Ser. No. 10/469,806, filed Apr. 14, 2004, now U.S. Pat. No. 7,440,698.

The invention relates to an optical transmitter system and more especially to an optical transmitter system for use in a wavelength division multiplex (WDM) optical communications system.

In conventional optical communication systems, communications traffic is communicated between a transmitter and receiver by means of optical radiation which is modulated with the communications traffic and which is conveyed by optical waveguiding means, typically an optical fibre. Optical radiation in the context of this patent application is defined as electromagnetic radiation within a free-space wavelength range from 560 nm to 2000 nm, although a free-space wavelength of substantially 1550 nm is a preferred part of this range.

In operation of optical communications system an optical fibre can suffer mechanical damage including breakage and it is desirable to prevent personnel in the vicinity of such a break being exposed to the escape of optical radiation, which may be of a level, which is hazardous to their eyesight or skin.

Two approaches to minimising this risk are: (i) to ensure, by design of the system, that the power level of the optical radiation carried by the fibre is always maintained below a "safe" level or (ii) to stop the supply of optical radiation to the fibre when there is an indication that a break may have occurred in the fibre. In the case of the latter the loss of the receipt of optical radiation at the receiver is taken as an indication of a potential fibre break. The latter method is often termed automatic laser shutdown (ALS). To re-start operation of the communications system, after ALS, it is known to re-start the laser after a specified period of time, currently 100 seconds, and pulse it for a short period of time. The duration of the pulse (typically two seconds) is selected to be sufficiently short as to not cause injury. When the receiver detects such a pulse it communicates back to the transmitter to re-commence normal operation.

To increase the transmission capacity of the communications system it is current practice to employ wavelength division multiplexing in which the modulated optical radiation comprises a plurality of radiation components, termed wavelength channels, having mutually different wavelength bands. Each wavelength channel is modulated with respective communications traffic and all of the channels simultaneously conveyed over a single optical fibre. Systems with eight or more wavelength channels are often termed dense wavelength division multiplex (DWDM) systems.

For WDM systems the optical power conveyed by a fibre is the sum of the separate component (wavelength channel) power levels and it is undesirable to limit this total power level to a safe level since this would unduly limit the span of the optical link between the transmitter and receiver. This is especially so for DWDM systems operating with many tens of wavelength channels and such systems consequently favour ALS arrangements.

In active WDM systems one of the wavelength channels, termed an Optical Supervisory Channel (OSC), is reserved for controlling the communications system by passing control protocols between nodes. The loss of OSC at the receiver is used as an indication of a break in a fibre and the lasers for all the wavelength channels are accordingly shut down. To re-activate the system OSC only is pulsed at 100-second intervals for 2 seconds to test the optical fibre link. If the OSC reaches the receiver the lasers for the communications channels are accordingly reactivated.

A problem arises however in passive WDM systems in which the wavelength channels are passively combined and each originates from optical sources that operate in complete independence of one another. In passive systems there is no central control function for safely re-activating the sources and consequently it is preferred in such systems to limit the total optical power to a "safe" level.

The present invention has arisen in an endeavour to at least in part overcome this problem.

According to the invention, a transmitter system for supplying a plurality of different wavelength optical radiation components to a transmission element which, in operation, is connected to the transmitter system for conveying the different wavelength radiation component to a respective receiver, comprises: means for detecting a loss of a wavelength radiation component at the respective receiver; and means for interrupting the supply of the wavelength radiation component in response to a detection of loss of the wavelength component at the receiver; characterised by timing means capable of providing respective restart times which differ one to another for the wavelength radiation components; and means for restarting the supply of the wavelength radiation component, following an interruption, at the restart time provided by the timing means.

Detection of the loss of the wavelength radiation component at the respective receiver is taken as an indication that there may be a break in the transmission element, or at least a problem in the source of the wavelength component and the supply of this radiation component is accordingly interrupted by the transmitter system. Clearly the loss of all of the radiation components at the respective receivers, which will result when there is a break in the transmission element, will result in the transmitter system interrupting the supply of all radiation components thereby preventing accidental escape of radiation from the break. Since the transmitter system reactivates supply of the radiation components at different restart times this ensures that even if there is a break when the system restarts only one, or only a few, of the radiation components will be present thereby limiting the power level of any escaping radiation. Moreover since the source of each wavelength component is restarted at its own restart time, independent of any other source, the present invention is particularly suited to a passive WDM system in which there is little or no central control function between the sources. In one arrangement, the timing means is capable of generating a pseudo-random sequence of respective restart times for the different wavelength radiation components.

Preferably, the timing means includes a timing unit at a source of each different-wavelength radiation component capable of generating a respective restart time. Preferably, the timing unit includes a pseudo-random number generator and the seed number used in the pseudo-random number generator is unique to the source.

In an alternative arrangement, the timing means is capable of generating a plurality of respective restart times based on the wavelength of the radiation component.

In one arrangement employing a seed number, the seed number used in the pseudo-random number generator includes the network address and port number of the source equipment.

In another arrangement employing a seed number, the seed number used in the pseudo-random number generator includes a laser card serial number of the source.

The invention also provides a method of operating an optical transmitter system comprising: supplying a plurality of different wavelength optical radiation components to a transmission element for transmission to a respective receiver; detecting a loss of a wavelength radiation component at the respective receiver; interrupting the supply of the wavelength radiation component to the transmission element on a detection of loss of the wavelength radiation component at the receiver; supplying respective restart times which differ one to another for the different-wavelength radiation components; and following an interruption, restarting supply of the wavelength radiation component at the respective restart time.

An optical transmitter system in accordance with the invention will now be described, by way of example only, with reference to FIG. 1 that is a schematic representation of a passive optical WDM transmitter/receiver system in accordance with the invention. The transmitter/receiver system provides n bi-directional communications links with a corresponding transmitter/receiver system located at an opposite end of the communication link.

Referring to the FIG. 1, the optical WDM transmitter/receiver system includes an output port 1 for connection to an output optical fibre 2 capable of transmitting a WDM optical signal comprising a plurality n of different wavelength channels ($\lambda_1$ to $\lambda_n$), optical radiation components. Typically the system would be configured for operation in C-band (i.e. a free-space wavelength of 1530 to 1565 nm) and have 32 wavelength channels with wavelength spacing between channels of 0.8 nm. It will be appreciated that the present invention applies equally to other wavelength ranges of operation having differing numbers of channels/channel spacings.

The WDM signal is generated by a wavelength selective multiplexer 3 which passively combines the individual wavelength channels ($\lambda_1$ to $\lambda_n$) from a respective optical fibres $OF_1$ to $OF_n$. As is known the wavelength selective multiplexer 3 could typically comprise an arrayed waveguide grating or cascaded dichroic filters. Each fibre $OF_1$ to $OF_n$ is connected to respective client equipment 4, which transmits the respective wavelength channel.

The transmitter/receiver system further includes an input port 5 for connection to an input optical fibre 6 for receiving a WDM signal comprising the plurality of n wavelength channels. The received WDM signal represents the communication link in an opposite direction. A passive wavelength selective de-multiplexer 7 is connected to the input port 5 and is operable to separate the constituent wavelength channels comprising the WDM signal and place each on a respective optical fibre identified as $LF_1$ to $LF_n$. The Fibres $LF_1$ to $LF_n$ are in turn connected to a respective client equipment 4. The wavelength selective de-multiplexer 7 could typically comprise an arrayed waveguide grating or cascaded dichroic filters.

In FIG. 1 there is shown only two client equipment 4 corresponding to bi-directional communications links that utilise wavelength channels $\lambda_1$ and $\lambda_n$ respectively. It will be appreciated that similar client equipment 4 exists for the other wavelength channels though these are not shown in the FIGURE for reasons of clarity. Each client equipment comprises a transmitter 8, transmitter controller 9, timing unit 10 and receiver 11. The transmitter 8 is operable to generate the respective wavelength channel and would comprise, for example, a semiconductor laser whose output radiation is modulated with communications traffic using an external optical modulator (e.g. A Mach-Zehnder optical modulator) connected to its output. It will be appreciated that in alternative configurations the laser can be modulated directly by modulating the drive current to the laser with the communication traffic. The output of the transmitter 8 is coupled into the respective optical fibre $OF_1$ to $OF_n$. The timing unit 10 is operable to generate a respective restart time ($t_1$ to $t_n$) for its associated transmitter 8. The transmitter controller 9 is for controlling operation the transmitter 8 and as will be described is operable to shut down operation of the transmitter (laser) in the event of a possible fibre break and to subsequently automatically restart the transmitter. The receiver 11 is for receiving and detecting communication traffic received on the respective optical fibre $LF_1$ to $LF_n$.

In the operation of the transmitter/receiver system, each transmitter 8 generates and transmits its respective wavelength channel along its respective optical fibre $OF_1$ to $OF_n$ to the multiplexer 3 which passively combines the wavelength channels (optical radiation components) to produce a WDM optical signal which is transmitted from the output port 1. The WDM optical signal is carried over the optical fibre 2 to a corresponding transmitter/receiver system (not shown) at a far end of the fibre.

Further in the operation of the transmitter system, a WDM signal is received at the input port 5 and conveyed to the wavelength de-multiplexer which passively separates the radiation components (wavelength channels) placing one on each of the optical fibres $LF_1$ to $LF_n$ from which the wavelength channels pass to the receiver 11 in a respective client equipment 4. The received WDM signal represents the opposite direction of communication for the bi-directional communications link.

The possibility exists that, in the operation of the system, mechanical breakage could occur in either of the optical fibres 2, 6 connecting the transmitter/receiver system to a corresponding transmitter/receiver system at a far end. For ease of description, the operation of the system in relation to a break occurring in the optical fibre 2 will be described though it will be appreciated that the system operates in a like manner for a break occurring in the optical fibre 6. Moreover in the following description the transmitter/receiver equipment illustrated in FIG. 1 will be referred to as the near end system and the transmitter/receiver at the far end referred to as the far end system.

The power level of the WDM signal being transmitted along the optical fibre 2 is the sum of the power levels of the individual wavelength channels conveyed by the optical fibres $OF_1$ to $OF_n$ and may be high enough to cause damage to, for example, the vision or skin of personnel in the vicinity of the break. As a safety measure, the transmission/receiver system includes provision for treating a loss of the WDM channels at the far end system as an indication that a mechanical break may have occurred in the optical fibre cable 2 and for switching off the transmitters in the near end system in that event. Safety is assured in that, if there is a mechanical break in the optical fibre 2, there is effectively no escape of laser-generated radiation, which would be at potentially hazardous power levels, from the break.

When a loss of the respective WDM channel is detected by the receiver 11 in the far end client equipment 4, this being indicative of a possible break in the fibre 2, the transmitter controller switches off its transmitter 8. In turn the loss of the wavelength channel is detected by the receiver 11 within near end client equipment 4 and the transmitter controller 9 shuts switches off its transmitter 8. Clearly in the case of an actual fibre break there will be a loss of all wavelength channels at the far end and each transmitter will accordingly switch off its transmitter.

In the operation of the system, following the switch-off of the transmitters, on an indication that a mechanical break may have occurred in the optical fibre 2, the system recommences transmission after a set period has elapsed in case the break has been repaired. This is done for each wavelength channel at a respective restart time $t_1$ to $t_n$ which differ one to another and which is generated by a respective timing unit 10. Since the re-activation of the transmitters (i.e. those at the near end) occurs at different restart times, the power transmitted into the optical fibre cable 2 at restart is too low in level to pose a threat to safety should it turn out that a mechanical break does exist in the optical fibre 2. The sequence of interrupted transmission followed by restart at respective restart times is repeated for as long as there is a detection of a break in the optical fibre 2 and, when a break is no longer detected at, restart proceeds until normal full transmission is attained.

Typically, there are 100-second wait periods before transmission is recommenced with restart attempts lasting of the order of 2 seconds. As soon as the receiver 11 at the far end detects the presence of the wavelength channel, the transmitter controller 9 re-activates its transmitter 8 and in turn this is detected at the near end by the receiver 11. Upon receipt of the wavelength channel the transmitter controller 9 switches the transmitter 8 to operate continuously.

Since each client equipment 4 includes a respective timing unit 10 this enables the system to be safely re-activated, after a possible fibre break, without a need for any interaction between the client equipment 4. In the embodiment illustrated each of the client equipment 4 operate in total in total independence of one another.

In a preferred implementation the timing units generate their respective restart time using a pseudo-random sequence. In such an arrangement the timing unit includes a pseudo-random number generator and the seed number used in the pseudo-random number generator is preferably unique to the transmitter.

The seed number used in the pseudo-random number generator can include the network address and port number of the source equipment or, alternatively, the seed number used in the pseudo-random number generator can include a transmitter (laser) card serial number of transmitter.

There is a possibility that more than one transmitter will be restarted at the same time as each timing unit generates a pseudo-random restart time independent of any other timing unit. However the probability of this occurring is acceptable since only a few transmitters are likely to be re-activated at any one time and it is likely that the optical radiation power level not to exceed the set safe level.

In an alternative arrangement the timing unit generates a restart time based on the wavelength channel.

Another possibility is that an operator sets restart times for the different wavelength channels, for example, at the time that the client equipment is installed.

A transmitter system in accordance with the invention is especially suited to a passive WDM system which includes little or no control between the wavelength channels (client equipment) and which includes passive (optical) components for performing the WDM functions (in particular optical multiplexing of the WDM wavelength channels). However a transmitter/receiver system in accordance with the invention using a staggered re-start of lasers after interruption is also considered to be advantageous in other WDM system.

The invention claimed is:

1. An optical transmitter system, comprising:
    a plurality of transmitters for supplying a plurality of optical radiation components having respective wavelengths to a transmission element operative for conveying the plurality of radiation components to a respective receiver;
    an interrupter for interrupting the supply of the radiation components;
    a timer for providing a respective restart time which differ one to another for each of the radiation components; and
    a controller for restarting the supply of the radiation components, following an interruption, at the respective restart time provided by the timer.

2. The transmitter system according to claim 1, in which the timer is operative for generating a pseudo-random sequence of respective restart times.

3. The transmitter system according to claim 1, in which the timer includes a respective timing unit at each transmitter which is capable of providing the respective restart time.

4. The transmitter system according to claim 3, in which the timing unit at each transmitter includes a pseudo-random number generator having a seed number used in the pseudo-random number generator which is unique to each transmitter.

5. The transmitter system according to claim 4, in which the seed number used in the pseudo-random number generator includes a network address and a port number of each transmitter.

6. The transmitter system according to claim 4, in which the seed number used in the pseudo-random number generator includes a laser card serial number of the respective transmitter.

7. The transmitter system according to claim 1, in which the timer is operative for providing the respective restart times based on the wavelengths of the radiation components.

8. The transmitter system according to claim 1, in which the timer is operative for providing the respective restart times which are preset at a time of installation of the transmitter system.

9. The transmitter system according to claim 1, in which the interrupter is operative for interrupting the supply of the radiation components in response to a loss of a radiation component at the respective receiver.

10. The transmitter system according to claim 1, in which the controller is operative for restarting the supply of the radiation components following an interruption by the interrupter.

11. The transmitter system according to claim 1, in which the controller is operative for restarting the continuous supply of the radiation components.

12. The transmitter system according to claim 1, in which the controller is operative for restarting the supply of radiation components for the transmission of communications traffic.

13. A method of operating an optical transmitter system, comprising the steps of:
    supplying a plurality of different wavelength optical radiation components to a transmission element for transmission to a respective receiver;
    interrupting a supply of the wavelength radiation components; and
    supplying respective restart times which differ one to another for the different wavelength radiation components and, following an interruption, restarting the supply of the wavelength radiation components at the respective restart time.

14. The method according to claim 13, in which the interrupting step is performed by interrupting the supply of the radiation components in response to a loss of a radiation component at the respective receiver.

15. The method according to claim 13, in which the interruption is performed by said step of interrupting the supply of the wavelength radiation components.

16. The method according to claim 13, in which said restarting the supply of the wavelength radiation components is performed by restarting the continuous supply of the wavelength radiation components.

17. The method according to claim 13, in which said restarting the supply of radiation components is performed by restarting the supply of radiation components for the transmission of communications traffic.

* * * * *